June 19, 1951 S. G. ISSERSTEDT 2,557,436

CONTAINER FOR PHONOGRAPH RECORDS

Filed March 2, 1948

Inventor

SIEGFRIED G. ISSERSTEDT by: Fetherstonhaugh & Co.

Att'ys.

Patented June 19, 1951

2,557,436

UNITED STATES PATENT OFFICE 2,557,436

CONTAINER FOR PHONOGRAPH RECORDS

Siegfried Gordon Isserstedt, Toronto, Ontario, Canada

Application March 2, 1948, Serial No. 12,593

3 Claims. (Cl. 312—12)

This invention relates to containers for phonograph records and the like, and is a continuation-in-part of my co-pending application Serial No. 627,389, now abandoned.

In connection with containers for phonograph records of the kind wherein a plurality of records are individually enclosed within folders held in a box-like container such as, for instance, the type of container contemplated by my above-mentioned application where the folders are selectively withdrawable by pulling on the tabs thereof, one difficulty has always been present as a constant source of trouble and annoyance. This difficulty results from the frictional engagement between adjacent folders, and is characterized, particularly in cases where the records are disposed horizontally, by the simultaneous dragging out of a number of records when the tab of one folder only is pulled. This not only makes it more difficult to select a given record from such containers but also necessitates the frequent pushing back in of all the undesired records which have been pulled out incidentally to the one selected.

The present invention is designed primarily to overcome such difficulties and has as a principal object thereof the provision of a record container of the type above-mentioned in which withdrawal of one record folder by pulling on the tabs thereof will not cause any of the other records in the container to move from the fully inserted position.

It is another object of the invention to provide a record container of the type described in which a frictional lock retains each record in the fully inserted position unless the tab of the folder enclosing the same is pulled.

It is also an object of the invention to provide a record container of the type described in which a plurality of records, for instance, consisting of a set, may be simply and easily loaded by the manufacturer by merely enclosing each individual record in a folder and inserting all the records thus enclosed folded-end-foremost into the container where they are retained and held by a frictional lock against inadvertent falling out.

With these and other objects in view the invention consists essentially in the positioning within a container of the type described of means for causing relative movement of each record with relation to the folder enclosing the same as the record and folder are inserted into the container so that such relative movement must take place in reverse before the record and folder can be withdrawn.

The invention will be more particularly described in the following detailed specification taken in conjunction with the accompanying drawings:

Figure 1:
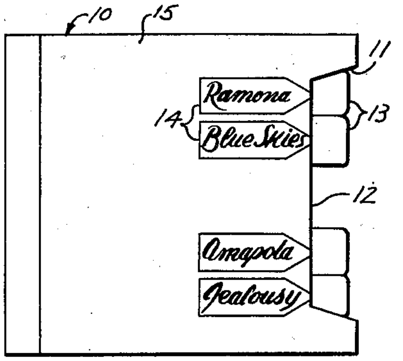
Figure 1 is a plan view of the type of container contemplated in my above-mentioned co-pending application which is a type of container to which my invention is particularly well-adapted.

Referring now more specifically to the drawings, a container for phonograph records according to the invention embodies an open-ended box-like container 10 which is open at one end 11 and which may be suitably cut away at the open end, for instance, as shown at 12 to provide for the type of indexing system as described in my above-mentioned co-pending application where each tab 13 corresponds to a title 14 disposed on the top 15 of the box 10.

Figure 2:
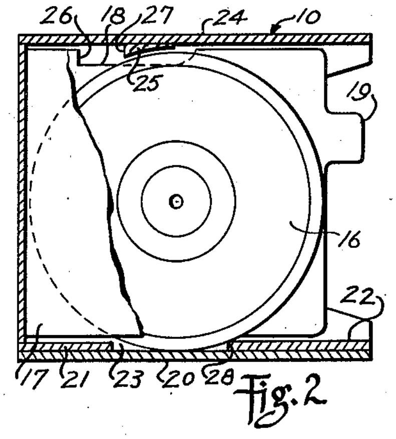
Figure 2 is a sectional view of such container with one folder flap partly cut away to show one type of means employed for carrying out the invention.

Referring particularly to the embodiment shown in Figure 2 it will be seen that the record 16 is enclosed within the folder 17 which is cut away at 18 for purposes to be described later. The folder 17 is also provided with the tab 19 for indexing purposes and for purposes of withdrawal from the box 10. It will be observed that the side 20 of the box 10 is provided with the two thickened portions 21 and 22 providing between them a recess 23 in which the record 16 normally protrudes when stored in a container. The opposite side 24 of the box 10 is provided with a stop 25 which extends transversely thereacross directly opposing the recess 23 in the side 20.

It will be observed that once the folder 17 has been inserted within the box and pushed past the stop 25, the said stop rides within the recess 18 on the folder and withdrawal of the folder is limited by the engagement of the shoulder 26 of the folder 17 against the shoulder 27 of the stop 25.

It will further be observed with the record in the position shown, withdrawal thereof by pulling on the tab 19 will cause the record 16 first of all to be pushed sideways slightly and then to turn slightly about the point 28 at the edge of the recess 23. Thus the record moves across slightly and rotates slightly with respect to the folder 17. Similarly, when the record is re-inserted into the container the stop 25 bears against the edge of the record 16 forcing the same across into the recess 23.

It will be particularly observed that it is impossible for either the folder 17 or the record 16 to leave the container unless the aforementioned relative motion takes place between the record 16 and the folder 17. It will be appreciated that such relative motion of the record and folder is opposed by a fairly considerable frictional force, since the area of frictional contact includes both sides of the record and the relative motion on withdrawal includes rotation as well as linear movement. Thus, in order to withdraw the record and folder from the container 10, a force must be applied thereto which is greater than the friction developed by the aforementioned relative movement of the record and folder. It is, of course, easy to supply such a force by manually pulling the tab 19.

If we now consider the forces tending to remove a given record and folder from the container when an adjacent record is withdrawn by manual pulling of a tab 19, it will be appreciated that the maximum force which can be thus applied will be the friction developed between the outside of the adjacent folders. However, to effectively overcome the friction involved in moving a record laterally and rotatively with respect to its enclosing folder, requires a much greater force than is developed by the mere friction of adjacent folders since obviously nearly twice the frictional area is involved in the relative movement of the record and folder while the normal force is substantially the same in each case. Therefore, since frictional forces between adjacent folders is not sufficient to overcome the frictional forces preventing relative movement of the folders and records, withdrawal of one record will not cause withdrawal of adjacent records due to the friction between adjacent folders. Thus, a sort of frictional locking in position of all the records and folders save the one being withdrawn is produced.

The movement of the record 16 with respect to the folder 17 enclosing the same will be essentially a transverse movement but it will be appreciated that depending upon the nature of the substance forming the point 28 rotation may also take place since if any gripping action takes place between the point 28 and the edge of the record, the record will also rotate about the point 28 during its transverse movement. This rotation is, of course, not essential to the effective operation of the frictional lock produced but it will be appreciated that any rotational movement of the record will increase the friction between it and the folder enclosing it and will tend to make the frictional lock more effective. In many cases, considerations of convenience of packaging and the like will cause a metallic pin or the like to be used at the point 28 as will later appear, in which case the record may or may not turn. Sufficient to say that for purposes of the operation of the invention it is sufficient if the relative motion of the record and folder is at least transverse.

The frictional lock produced in the aforementioned manoeuvre is most effective in retaining the complete set of records in place in the container, and especially where the set fills the latter. In this case it is possible to turn the container open-end-down and shake it without any of the records falling out. Of course, if the container is not full, the frictional lock is not as effective when the container is up-ended in this manner, since there is no normal force to develop the necessary friction to maintain the lock.

The invention, however, provides for a most convenient method of packaging sets of phonograph records, since if the container is made of a size that will just hold the set, and no more, the sets may be packaged for the market by the manufacturer merely by enclosing the records in folders, forming the records into sets, projecting the sets into the containers, wherein they are firmly held against inadvertent falling out by means of the aforementioned frictional lock. Thus, the containers may be packed for shipment without the necessity of using any special retaining means to keep the records from falling out en route.

It will be appreciated that there are a great number of different means for putting the invention into effect. Of these, four preferred embodiments of suitable alternative means are illustrated in Figures 3 to 6.

Figure 3:
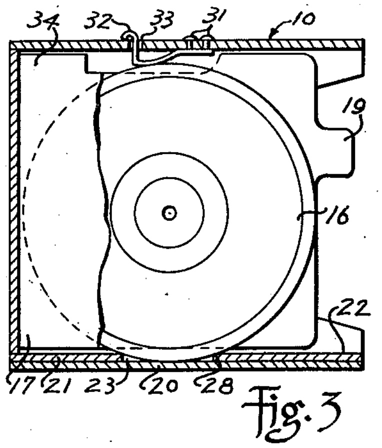
Figure 3 is a similar view to that shown in Figure 2 showing an alternative embodiment of the invention.

Referring to Figure 3, for instance, the stop 30 is resilient in character, being suitably made of thin, resilient metal sheet. The stop 30 is secured to the container wall, for instance, by the rivets 31, and the rolled over end 32 thereof extends outside the container through the slot 33. The stop 30 is sufficiently strong that during insertion of single records in the container, depression thereof will not occur. However, during initial loading of the container, when all the folders and records are inserted simultaneously, the stop 30 will be depressed to permit passage of the portions 34 of the folders, and will then spring out again to the position shown where it acts during re-insertion of single records, in the manner already described in connection with the stop 25 in Figure 2.

Figure 4:
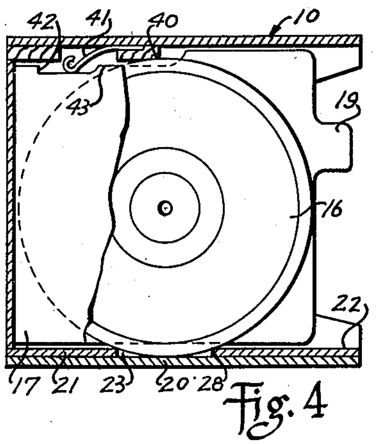
Figure 4 shows a similar view of another embodiment.

In Figure 4, the stop 40 is fixed, and the secondary stop means 41 which is resilient in character acts only as a means of limiting withdrawal of the folder 17 by catching on the shoulder 42 thereof. The folder 17 is appropriately cut away to provide for the division of functions between the stop 40 and the secondary stop means 41 as shown at 43, and it will be noted that on insertion of the folders to the storage position shown, the folder 17 does not foul the stop 40.

Figure 5:
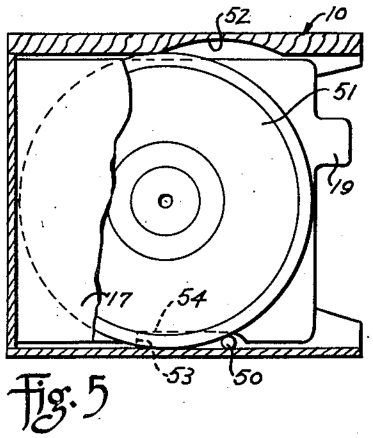
Figure 5 is a similar view of yet another embodiment.

The embodiment shown in Figure 5 is simplified in construction yet provides for a greater relative movement of the folders and records upon withdrawal and re-insertion thereof. In this case the stop means are in the form of a pin 50 which causes the record 51 to ride over into the rounded recess 52.

However, it will be observed that in order to pass from the position in which the record 51 is pushed to a maximum extent into the recess 52 either into storage or out of the container, the record 51 must again move transversely with respect to the folder 17. This increase in the total resistance to withdrawal or insertion of the records does not impede the insertion or withdrawal of individual records to an appreciable extent but provides for a more positive frictional lock and makes inadvertent falling out of the records virtually an impossibility when the container is full.

A convenient method of loading the container illustrated in Figure 5 is to load the records and folders into the container before the pin 50 is fixed in position and then to fix the pin in position by passing it through suitable holes previously formed in the walls of the container to retain the set of records in position. It will be observed further that in this case the pin 50 serves the dual purpose of causing transverse movement of the records 51 as well as limiting withdrawal of the folders 17 by engaging the shoulders 53 in the cut-away portion 54 thereof.

Figure 6:
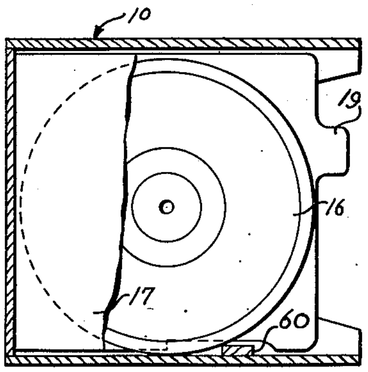
Figure 6 is a similar view of an embodiment particularly adapted to cases where the container is to be used in an upright position with the records disposed vertically.

Figure 6 shows an embodiment of the invention particularly adapted to cases where the records are to be stored in a vertical position. In this case it is not essential to have a recess in the wall of the container opposing the stop means, since the force of gravity may be relied on to cause the records to descend to the storage position shown. Thus the container is formed merely with the stop 60 which in this instance also serves as a stop to limit the withdrawal of the folders 17 in a manner already described in connection with the stop 50 in Figure 5.

It will be appreciated that in the container shown I have provided a very simple and easily constructed package for holding records from which the records will not easily become inadvertently dislodged and from which one record may be selectively withdrawn at a time without causing any of the other records stored within the container to be simultaneously pulled out. It will also be appreciated that I have disclosed a simple and novel method of packaging phonograph records in sets for shipment, which eliminates the necessity for provision of special retaining means to provide against inadvertent dislodgement of the records during shipment.

What I claim as my invention is:

1. A disc holder comprising in combination a vertically arranged casing open at the front thereof, and a vertically arranged disc-containing envelope slidably disposed within the casing and resting on the floor thereof, the envelope being partially removable from the casing, said envelope being open at the front thereof whereby a disc disposed within the envelope through the open front thereof is supported atop the casing floor, stop means fixed to the casing and extending into the bottom of the envelope, said stop means limiting movement of the envelope out of the casing, and also limiting movement of the disc out of the envelope when the latter is wholly within the casing, movement of the envelope partially out of the casing raising the disc upward of the bottom of the envelope and of the casing floor over, atop and past the stop means, whereby the disc may then be withdrawn readily from the envelope through the open front.

2. A container for phonograph records and the like comprising a box-like receptacle, a plurality of folders each adapted to enclose a record, and adapted to fit within said receptacle, means in connection with and within said receptacle for moving the records transversely with respect to the folders enclosing the same when said records and folders are moved in or out of a storage position within said receptacle, said folders being appropriately cut away to permit free operation of said means, said means for moving the records transversely with respect to the folders enclosing the same comprising stop means connected to said receptacle and adjacent one side thereof, the opposite side of said receptacle being formed with a recess for co-operation with said stop means, said stop means being adapted to bear on the edge of the records as they are inserted into the receptacle causing the same to move transversely with respect to the folders enclosing the same into the recess.

3. A container for phonograph records and the like comprising a box-like receptacle, a plurality of folders each adapted to enclose a record, and adapted to fit within said receptacle, means in connection with and within said receptacle for moving the records transversely with respect to the folders enclosing the same when said records and folders are moved in or out of a storage position within said receptacle, said folders being appropriately cut away to permit free operation of said means, said receptacle being adapted to store records vertically in a storage position, said means for moving the records transversely with respect to the folders enclosing the same comprising an obstruction inside the receptacle and transversing the bottom thereof, said obstruction being adapted to bear against the lower edge of records as they are moved out of said storage position causing said records to elevate and move at least transversely with respect to the folders enclosing the same.

SIEGFRIED GORDON ISSERSTEDT.

REFERENCES CITED

The following references are of record in the file of this patent:

UNITED STATES PATENTS

| Number | Name | Date |
|---|---|---|
| 989,031 | Oliver | Apr. 11, 1911 |
| 1,056,835 | Robbins | Mar. 25, 1913 |
| 1,274,191 | Nixon | July 30, 1918 |
| 1,569,207 | Sears | Jan. 12, 1926 |